United States Patent [19]

Jelezov et al.

[11] Patent Number: 4,934,576
[45] Date of Patent: Jun. 19, 1990

[54] PLANETARY WIRE-FEEDING MECHANISM

[75] Inventors: Jivko Y. Jelezov; Julian P. Marinov; Todor D. Bogdanov; Peter A. Popov; Peter S. Tzanov; Dimiter V. Kantchev, all of Sofia, Bulgaria

[73] Assignee: Ziit, Sofia, Bulgaria

[21] Appl. No.: 850,495

[22] Filed: Apr. 10, 1986

[51] Int. Cl.$^5$ .................. B65H 51/04; B65H 51/32
[52] U.S. Cl. .................. 226/181; 226/187; 226/194
[58] Field of Search .......... 226/168, 169, 174, 176, 226/181, 183, 188, 186, 194

[56] References Cited

U.S. PATENT DOCUMENTS

| 4,333,594 | 6/1982 | Cloos | 226/176 |
| 4,429,821 | 2/1984 | Jezelov et al. | 226/181 |

FOREIGN PATENT DOCUMENTS 58-144055 8/1983 Japan .

Primary Examiner—Stuart S. Levy
Assistant Examiner—Steven M. duBois
Attorney, Agent, or Firm—Klein & Vibber

[57] ABSTRACT

A planetary wire-feeding mechanism has a left and right driving roll with hyperboloid profiles in a housing made up of two equal left and right cylinders, with an axis of rotation coinciding with the geometric axis of the electrode wire. The two cylinders contact one another and are joined detachably. In each of them there is shaped semi-cylindrical seats having parts with a common axis perpendicular to the geometric axis of the electrode wire and disposed in the plane of contacts between the two cylindrical parts. In the semi-cylindrical seats there are mounted two identical units, disposed in opposite directions, each unit having a base and two opposite legs, the legs of the two oppositely disposed units being interdigitated when they are mounted within the housing. Such units constitute supporting-guiding components upon which they are disposed on the right and left driving rolls. The surrounding walls of the supporting-guiding components are shaped as two opposite quarter-cylinder sectors with two coaxial (front and rear) semi-holes, the axis of which coincide with the geometrical axis of the electrode wire. In the quarter-cylinder sectors, two supporting holes are also provided, the axis of which is perpendicular to the geometrical axis of the electrode wire and crosses it at an angle alpha. The supporting axes of both supporting-guiding components cross each other at an angle 2 alpha, while the electrode wire is disposed in the bisectrix of the angle.

6 Claims, 5 Drawing Sheets

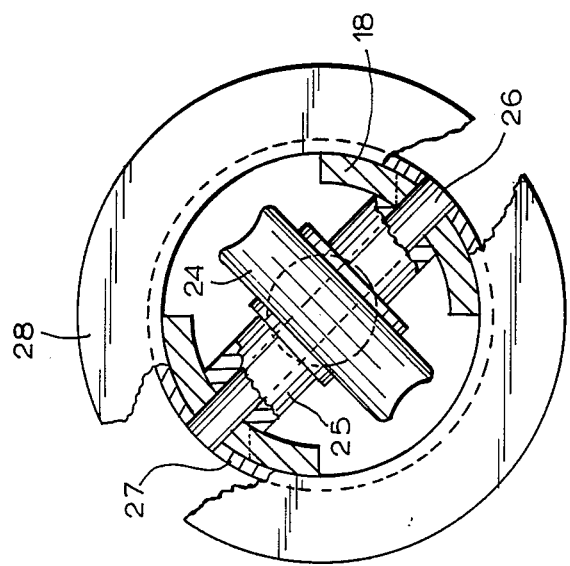
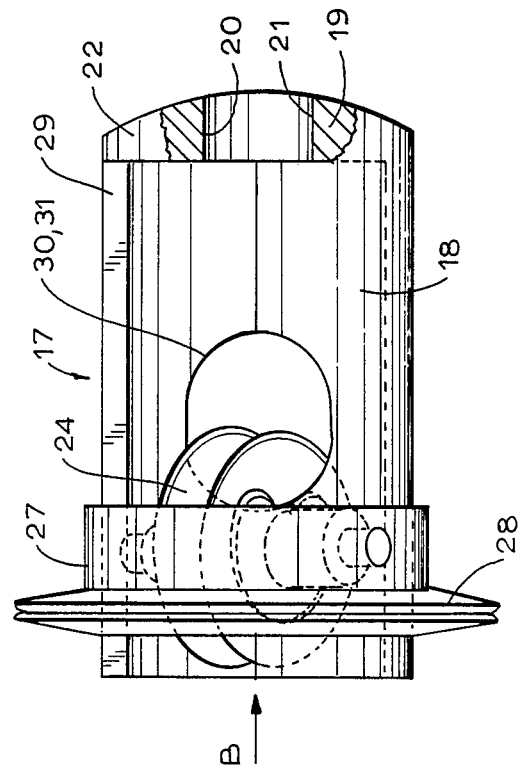

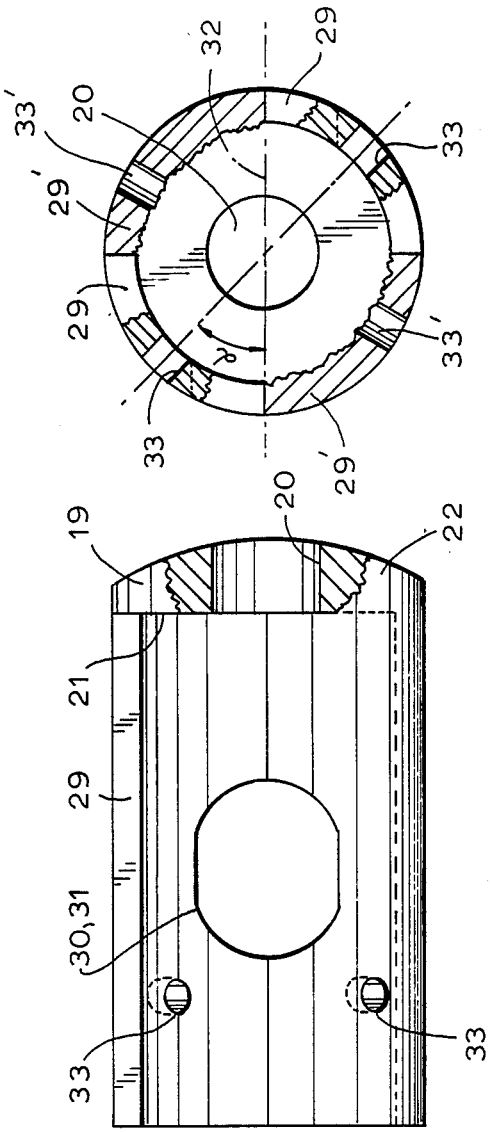

PLANETARY WIRE-FEEDING MECHANISM

This invention relates to a planetary wire-feeding mechanism which can be used for the feeding of solid and tubular steel and aluminium welding wires.

A known planetary wire-feeding mechanism (Bulgarian Author's Certificate No. 32 324) comprises a left and right driving roll, each with a hyperboloid profile, which is mounted rotatably on a shaft which is disposed in cantilever fashion on a respective piston. The outer faces of the pistons engage the short arms of two-arms levers, which are pivotally mounted on the housing and are arranged transversely to the axis of the electrode wire. The long arms of the two-arms levers are in contact with a cam body, which is rotatably mounted on the shank of the housing. To the cam body there is fixed one end of a flat spring having the shape of an Archimedes' spiral, the other end of the levers being fixed in a groove in the shank of the housing.

A drawback of this mechanism lies in the cantilever support of the driving rolls; this results in the inevitable formation of a torque which tends to rotate them together with the pistons around the axis of the latter, and leads to the occurrence of an undesired point contact between the rolls and the electrode wire.

Another drawback lies in the fact that the construction of the planetary wire-feeding mechanism is sensitive to the formation of torques which influences the magnitude of the electrode feeding force.

It is therefore a general object of this invention to provide a planetary wire-feeding mechanism in which point contact between the rolls and electrode wire is avoided, as well as avoiding the formation of torques which influences the magnitude of the electrode feeding force.

The above objects are achieved by the mechanism in accordance with the present invention. In such mechanism there are provided a left and a right driving roll, each with a hyperboloid profile, such rolls being disposed within a housing. The housing consists of two similar cylinders—a left cylinder and a right cylinder—with an axis of rotation coinciding with the geometric axis of the electrode wire. The left and right cylinders are in touch, one with the other, in the contact plane between and are detachably connected together. In each of the cylinders, there are provided semi-cylindrical seats—a cup seat, a sleeve seat, and a spring seat—, all with a common axis, such axis being perpendicular to the geometric axis of the electrode wire and being disposed in the plane of contact between the two cylinders which form the housing of the mechanism. On the axis of the left and right cylinders forming the housing, bosses are provided internally thereof, and in the front side of each of them there is provided a centering Morse cone, a fixing threaded hole, and a central hole forming a guide for the electrode wire as it passes therethrough. In the semicylindrical seats, i.e. the cup, the sleeve seat, and spring seat, there are mounted two identical units —a left unit and a right unit. Each of such unit is composed of a supporting-guiding component, shaped as a cylindrical cup with a base. The internal side of the base is formed as a plane surface, while its external surface forms a part-cylindrical surface which lies generally along the outer cylindrical surface of the respective cylindrical parts of the housing. On the inner end of one of the supporting-guiding elements, there is mounted a right driving roll, and on the inner end of the other supporting-guiding element, there is mounted a left driving roll, each of the driving rolls being mounted on a carrying axle made in the form of a sleeve. Within the carrying axle there is disposed a supporting axle. The central portions of the supporting-guiding components are supported in central sleeve seats within the radially outer ends of the supporting-guiding components, disposed in respective cup seats in the housing parts. Between each end of the central sleeve seat and the respective cup seat, there is disposed a spring seat which receives a stack of discs or Bellville springs, which press the respective left and right units radially inwardly toward each other so as to thrust the driving rolls carried thereby into a firm driving engagement with an electrode wire being fed by the mechanism.

Each of the supporting-guiding components is generally of U-shaped, the parallel opposite legs of the U being in the shape of sections of a cylindrical tube, each leg expanding at an angle of 90°. When mounted in the housing, the supporting-guiding components are disposed in opposite directions with the legs of the oppositely disposed U-shaped components being interdigitated. When the thus interfitting support-guiding components are mounted in the housing, they are disposed coaxial thereof and accurately fit within the cup seats and the sleeve seats of the respective halves of the housing.

The two opposite legs of each of the supporting-guiding components, which are shaped as two opposite quarter-cylindrical sections, are provided with two coaxial semi-holes —a front hole and a rear one. In the quarter-cylindrical sections, there are also provided two supporting holes, the axis of which is perpendicular to the geometrical axis of the electrode wire and crosses such geometrical axis of the electrode wire at an angle of $\alpha$. The supporting axes of both supporting-guiding components cross themselves at an angle of $2\alpha$, while the electrode wire is disposed in the bisectrix of this angle.

The advantages of the mechanism according to the invention is its simple design, its components are adapted to easy manufacture, and it can feed electrode wires of different diameters, and that its limits of variation of the feeding forces are considerably narrower in the whole range of variation of the speed of electrode wire feeding by the mechanism.

For a better understanding of the invention, reference should be made to the accompanying drawings, which illustrates and describes a preferred embodiment of the invention.

In the drawings:

FIG. 1 is a view of the mechanism along the lines 1—1 of FIG. 2 with a right cylinder and the four connecting screws removed;

FIG. 1' is a view similar to FIG. 1, but with several elements removed for clarity;

FIG. 5 is a view in elevation of the supporting-guiding component with its stack disc springs which are shown at the left in FIG. 1;

FIG. 6 is a view in end elevation taken in the direction of B (from left to right) in FIG. 5, portions of the stack disc springs being broken away;

FIG. 7 is a view in partially side elevation and partially in diametric section of the supporting-guiding portion of the component shown in FIG. 5; and FIG. 8 is a fragmentary view in cross section taking along the lines 8—8 of FIG. 1, the view showing the manner of interdigitation of the legs of the two U-shaped parts of the supporting-guiding components.

Figure 2:
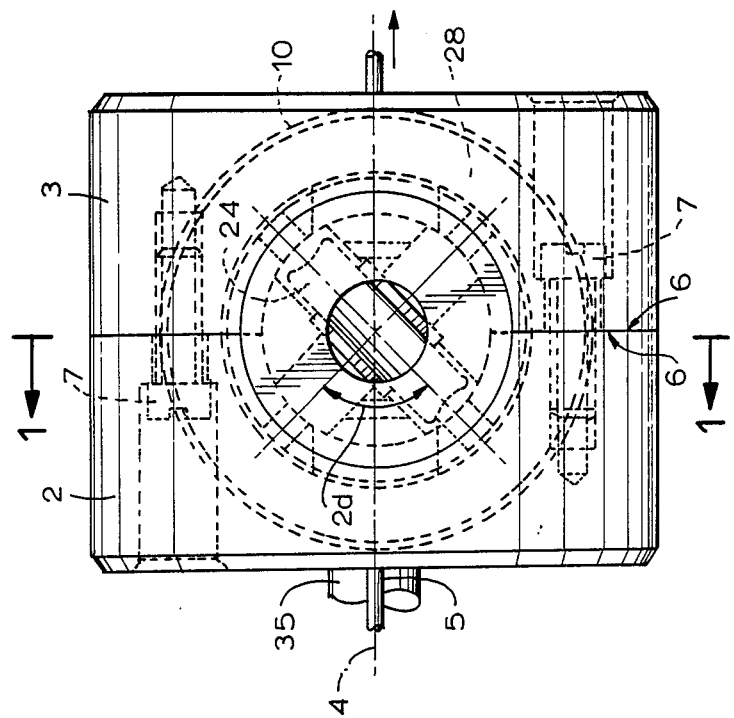
FIG. 2 is a view in side elevation of the complete housing of the mechanism, a fragment of a tubular member for rotatably driving the housing being shown attached to a left side thereof.
Figure 1:
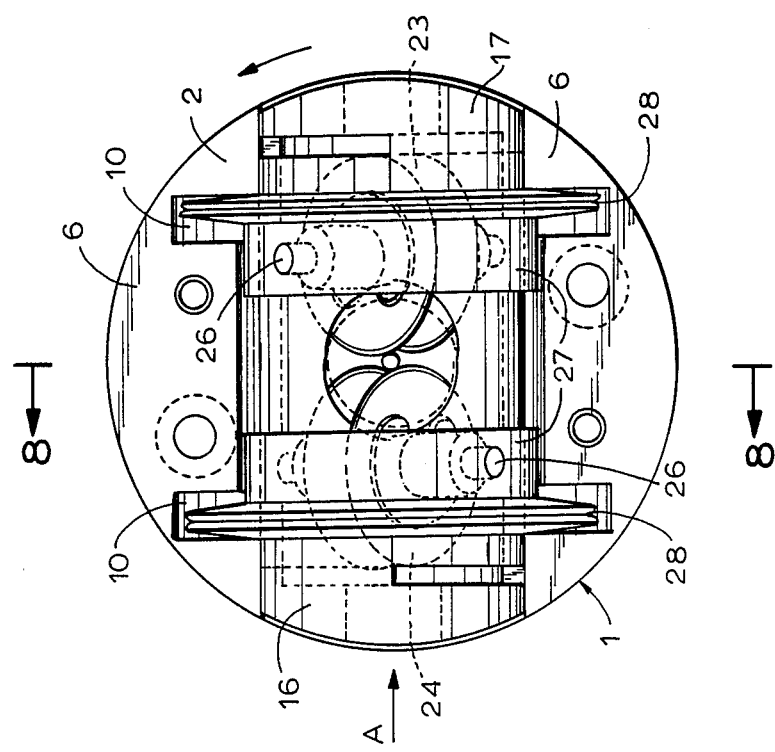
Figure 1:
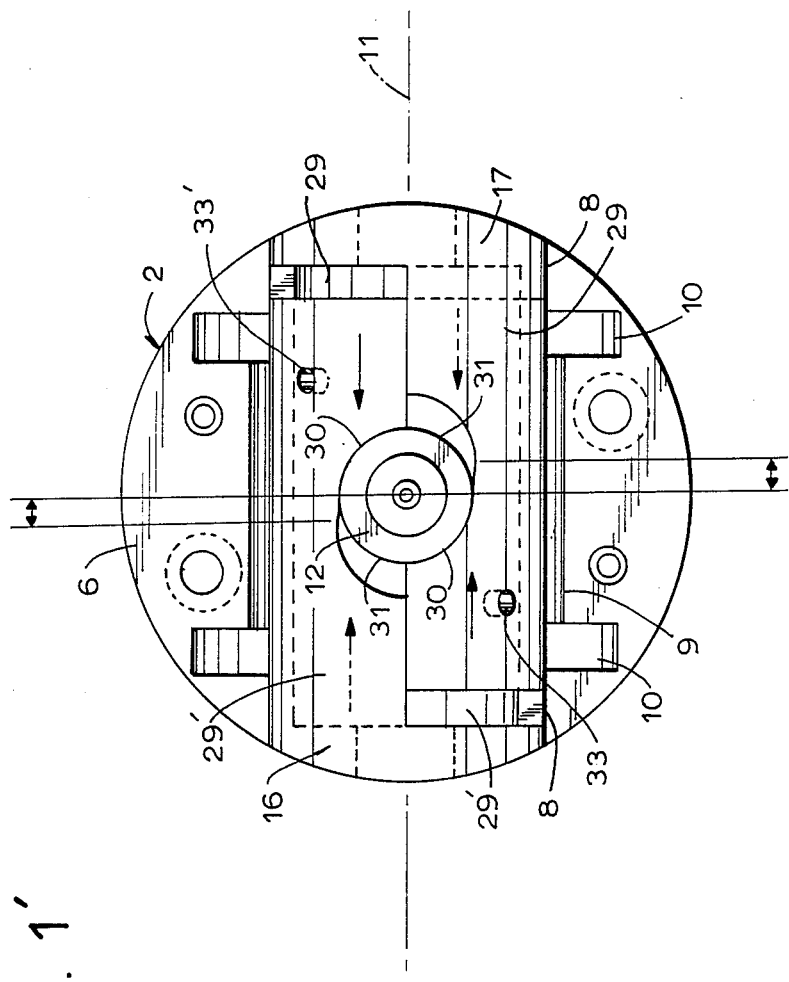
Figure 3:
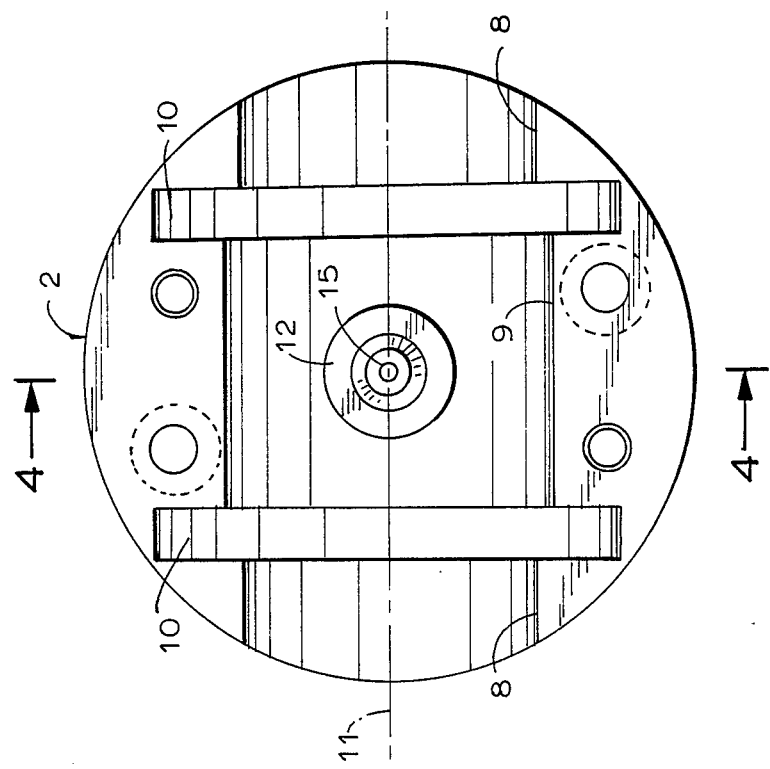
FIG. 3 is a view in rear elevation of the left hand cylindrical housing part of the housing with the supporting-guiding components and the stacks of disc springs removed therefrom, the view being taken along the lines 1—1 of FIG. 2.

Turning first to FIGS. 1 and 2, the planetary wire-feeding mechanism shown there as a housing 1 which is composed of two identical cylinders, a left cylinder 2 and a right cylinder 3. They are fitted and secured together in coaxial relationship about a geometrical axis 4, which coincides with the path of travel of an electrode wire 5, which is being fed from left to right in FIG. 2. The left cylinder 2 and the right cylinder 3 are in contact along a plane contact surface 6 and are fastened together with screws 7. In both the left cylinder 2 and the right cylinder 3 there are shaped semi-cylindrical seats (FIG. 3), a central sleeve seat 9, and an outer cup seat 8, spring seats 10 being disposed between the respective ends of the central sleeve seat 9 and the cup seat 8. All these seats are disposed along a common axis 11 which is perpendicular to the geometrical axis 4 of the electrode wire 5. In the geometrical axis of both identical cylinders 2 and 3, there are provided the cylindrical boss 12, in the outer end part thereof there being disposed a centering Morse cone 13, a fixing threaded hole 14, and a central hole 15 through which an electrode wire passes as it is being fed by the mechanism.

Referring now to FIG. 1' the disposition of the left unit 16 and the right unit 17 is clearly seen in the left cylinder 2 and oriented by its boss 12. The axis 4 of the electrode wire 5 (coinciding with the axis of rotation of the electric motor) is perpendicular to the sheet plane. For clear expression of the idea FIG. 1' does not show the driving rolls 23, 24, both axles 25, both axles 26 and both stacks of disk springs 28.

When the left unit 16 and the right unit 17 are in the housing 1, i.e. the mechanism is entirely assembled (see FIG. 1 and FIG. 2) the left and right stacks of springs are compulsory deformed. The forces of the compulsory deformation of the right stack springs 28 presses the left unit 16 through the right supporting sleeve 27 and the right supporting axle 26 passing through coaxial supporting holes 33' of surrounding walls 29' of the left supporting guiding part 18 along its front quarter cylinder 30 to the cylindrical boss 12 of the right cylinder 3, respectively rear quarter cylinder 31 to the cylindrical boss 12 of the left cylinder 2.

Identically, the forces of preliminary deformation of the left stack springs 28 presses the right unit 17 through the left supporting sleeve 27 and the left supporting holes 33 of surrounding walls 29 of the right supporting-guiding part 18 along its front quarter cylinder 30 to cylindrical boss 12 of right cylinder 3, respectively rear quarter cylinder 31 to cylindrical boss 12 of the left cylinder 2.

From FIG. 1' it is evident that the front hole 30 and rear hole 31 (FIG. 7) of surrounding walls 29, 29' consist of two front quarter cylindrical cuts and rectilinear sections. The length of these rectilinear sections is equal to the maximal path to which the left unit 16 can be shifted to the right and the right unit 17 can be shifted to the left.

On FIG. 1' through the Wire Feeding Mechanism 1, there is no electrode wire and the rolls 23, 24 are not pressed along their hyperboloidic profiles. It is clear that the slack between them must be smaller than the smallest diameter of the electrode wire that can be driven by the mechanism.

In the presence of a wire with diameter "d" via the mechanism, the left unit 16 will shift along the axis 11 to the right at a distance $(d-L)/2$ (where L is the slack between the rolls 23, 24). Moreover, the right unit 17 will shift along the axis 11 to the left at a distance $(d-L)/2$, i.e. each of the two stacks spring 28 will be deformed supplementary by $(d-L)/2$. The shift of 16 and 17 proceeds by sliding along slide walls and the rectilinear sections of front hole 30 and rear hole 31. The directions of the shift of 16 and 17 are shown in FIG. 1' with a dotted line and arrows.

In the semi-cylindrical seats, i.e. the cup seats 8, the sleeve seat 9, and spring seat 10 of each of the left and right cylindrical housing parts 2 and 3, there are mounted two identical but oppositely disposed units or components—a left unit 16 (FIG. 5) and an identical but oppositely disposed right unit 17—, the components 16 and 17 being disposed coaxially of the common axis 11. Each of the left and right hand units 16 and 17, respectively, has a supporting-guiding part 18, shaped as a part-cylindrical cup with a base 19 with a central hole 20 therethrough. The internal side of the base 19 is shaped as a planer surface 21, while its external side is shaped as a part-cylindrical surface 22. Toward the outer end of each of the supporting-guiding parts, there is disposed a driving roll, the driving roll for the left unit 16 being designated 23 and the driving roll for the right component 17 being designated 24.

Each of the driving rolls 23 and 24, which are of hyperboloid profile, is mounted on a carrying axle 25 in the shape of a sleeve. In each of the carrying axle 25, there is disposed a supporting axle 26. Near the outer end of each of the supporting-guiding part 18 of components 16 and 17, there are slidably mounted supporting sleeves 27. The left component 16 and the right component 17, when there is no electrode wire in the mechanism, are pressed towards the bosses 12 by respective stacks of disc springs 28 by means of the supporting sleeves 27. Each stack of disc springs 28 is mounted in the respective pair of springs semi-cylindrical seats 10, the springs being axially compressed and the driving rolls are not in contact and the housing cylinders 2 and 3 are together as shown in FIG. 2.

As shown in FIG. 8, the surrounding walls 29 and 29' of the respective supporting-guiding parts 18 are shaped as two opposite quarter-cylindrical sectors with two coaxial semi-holes—a front hole 30 and a rear hole 31—with an axis 32 coinciding with the geometrical axis of the electrode wire 5. The walls 29, 29' are also provided with two coaxial supporting holes 33, 33', the axis of which is perpendicular to the geometrical axis 4 of the electrode wire 5, and which in turn crosses it at an angle $\alpha$. The supporting axles 26 of the supporting-guiding parts 18 are crossed in-between at an angle $2\alpha$, while the electrode wire 5 is disposed in the bisectrix of this angle.

Figure 4:
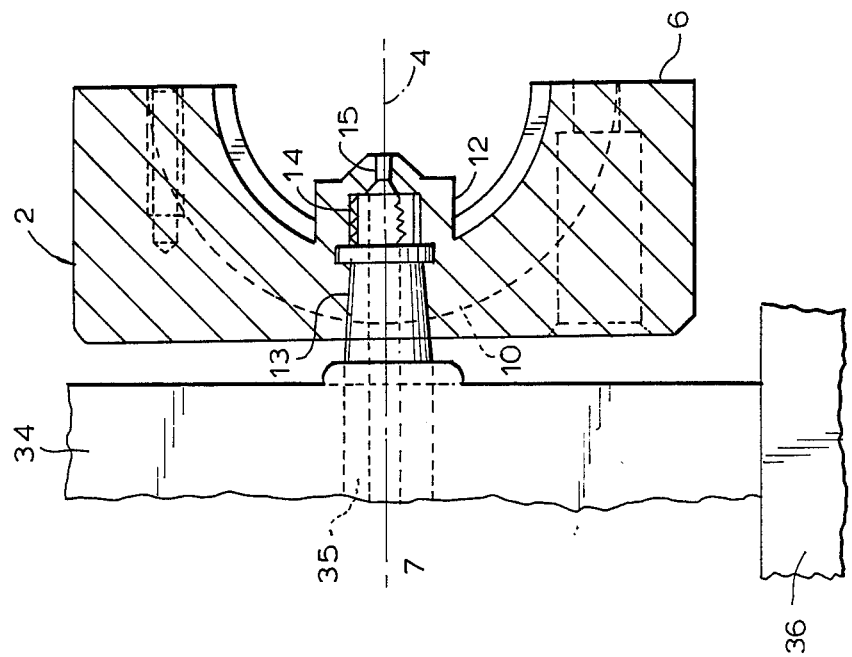
FIG. 4 is a view in cross-section taking along the lines 4—4 in FIG. 3, a fragmentarily shown driving motor being connected to the hollow driving shaft attached to the forward, left hand end of the mechanism.

The above-described mechanism operates as follows:

The housing 2, 3 is rotated by an electric motor 34 (FIG. 4) in a counterclockwise direction with respect to a person standing in front (to the left) of it in the drawings. The centering of the mechanism with respect to the electric motor 34 is effected by the Morse cone 13, and it is affixed thereto by the thread on the inner end of the hollow motor shaft 35, which meshes with the threaded hole in the boss 12. The motor 34 is supported upon a motor support 36 as shown in FIG. 4.

The front end of the electrode wire 5 is passed by the operator through the hollow shaft 35 of the electric motor 34 toward the central hole 15 of the mechanism. The wire-feeding mechanism takes the electrode wire up automatically. The left hand unit 16 and the right hand unit 17 transmit the forces used by the deformation of the stacks of disc springs 28 via the hyperboloid surfaces of the driving rolls 23 and 24 to the electrode wire 5. These forces, and the centrifugal forces of the masses of the left unit 16 and right unit 17 produce tangential forces, which are applied to the electrode wire 5 along its axis 4 and thus moves it in the direction of feed thereof to the welding station.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. A planetary wire-feeding mechanism, comprising
   a housing made up of two similar cylindrical parts coaxially mounted and secured together, the housing being mounted for rotation about the common axis of the two parts thereof, the housing having a central passage therethrough, coaxial thereof;
   two oppositely disposed supporting-guiding parts slidably mounted and guided in the passage through the housing;
   left and right driving rollers with hyperboloid profiles being rotatably mounted upon the respective supporting-guiding components; and
   spring means within the housing for resiliently rigging the supporting-guiding parts with their respective driving rolls toward each other, whereby the driving rolls engage an electrode wire traveling through the central passage in the housing;
   wherein the driving rolls are supported upon the respective supporting-guiding parts by a carrying axle secured to each roll;
   the carrying axle being in the form of a sleeve; and
   a supporting axle extending through the carrying axle and terminating on opposite surfaces of a supporting sleeve which is slidably mounted upon the opposite sides of the respective supporting-guiding component.

2. A planetary wire-feeding mechanism, according to claim 1, wherein the springs are compression springs, and further comprising
   screws for securing the two parts of the housing together, the tightening of the screws subjecting the springs to compression when the driving rolls are in contact in the absence of an electrode wire traveling through the mechanism.

3. A planetary wire-feeding mechanism according to claim 1, wherein each of the supporting-guiding parts is shaped as a cylindrical cup having spaced oppositely disposed sides each of the side walls subtending a central angle of 90 degrees, whereby
   when the two supporting-guiding parts are mounted in the housing, the opposite sieds of respective parts are interdigitated and their outer surface form a complete circular cylinder,
   the central path guiding passage being of circular cylindrical shape, and the complete circular cylinder formed by the interdigitated supporting-guide part accurately fits within the central guiding passage in the housing.

4. A planetary wire-feeding mechanism according to claim 3, wherein the central guiding passage through the housing comprises
   a central sleeve seat, radially outer cup seats, and transverse spring seats between the respective ends of the sleeve seat and the cup seats,
   the supporting-guiding parts having outer surfaces accurately mating with the sleeve seat and the cup seats in the housing, and
   the springs within the housing are in the form of stacks of spring discs received within the spring seats in the housing.

5. A planetary wire-feeding mechanism according to claim 1, further comprising
   an electric motor, the motor having a hollow driving shaft, and
   means for connecting the planetary wire-feeding mechanism to the shaft of the motor and supporting thereon, including a centering Morse cone and a screw connecting means.

6. A planetary wire-feeding mechanism, comprising
   a housing made up of two similar cylindrical parts coaxially mounted and secured together, the housing being mounted for rotation about the common axis of the two parts thereof, the housing having a central passage therethrough, coaxial thereof;
   two oppositely disposed supporting-guiding parts slidably mounted and guided in the passage through the housing;
   left and right driving rollers with hyperboloid profiles being rotatably mounted upon the respective supporting-guiding components; and
   spring means within the housing for resiliently rigging the supporting-guiding parts with their respective driving rolls toward each other, whereby the driving rolls engage an electrode wire traveling through the central passage in the housing;
   wherein each of the supporting-guiding parts is shaped as a cylindrical cup having spaced oppositely disposed sides each of the side walls subtending a central angle of 90 degrees, whereby
   when the two supporting-guiding parts are mounted in the housing, the opposite sieds of respective parts are interdigitated and their outer surface form a complete circular cylinder,
   the central path guiding passage being of circular cylindrical shape, and the complete circular cylinder formed by the interdigitated supporting-guide part accurately fits within the central guiding passage in the housing;
   wherein the driving rolls are supporting upon the respective supporting-guiding parts by a carrying axle secured to each roll,
   the carrying axle being in the form of a sleeve which expands the distance between opposite sides of the respective supporting-guiding part, and
   a supporting axle extending through the carrying axle and terminating on opposite surfaces of a supporting sleeve which is slidably mounted upon the opposite sides of the respective supporting-guiding component.

* * * * *